United States Patent
Wang et al.

(10) Patent No.: US 12,475,328 B2
(45) Date of Patent: Nov. 18, 2025

(54) METHOD FOR TRAINING NON-AUTOREGRESSIVE TRANSLATION MODEL

(71) Applicant: BEIJING BAIDU NETCOM SCIENCE TECHNOLOGY CO., LTD., Beijing (CN)

(72) Inventors: Xiyang Wang, Beijing (CN); Ruiqing Zhang, Beijing (CN); Zhongjun He, Beijing (CN); Zhi Li, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 271 days.

(21) Appl. No.: 17/974,317

(22) Filed: Oct. 26, 2022

(65) Prior Publication Data
US 2023/0051373 A1    Feb. 16, 2023

(30) Foreign Application Priority Data
Nov. 16, 2021 (CN) .......................... 202111353568.8

(51) Int. Cl.
| | |
|---|---|
| *G06F 40/47* | (2020.01) |
| *G06F 40/44* | (2020.01) |
| *G06N 3/0455* | (2023.01) |
| *G06N 3/088* | (2023.01) |

(52) U.S. Cl.
CPC ............. *G06F 40/47* (2020.01); *G06F 40/44* (2020.01); *G06N 3/0455* (2023.01); *G06N 3/088* (2013.01)

(58) Field of Classification Search
CPC ....... G06F 40/47; G06F 40/44; G06N 3/0455; G06N 3/088
USPC .......................................................... 704/9, 2
See application file for complete search history.

(56) References Cited

U.S. PATENT DOCUMENTS

2023/0051373 A1*   2/2023   Wang ................... G06N 3/0455

FOREIGN PATENT DOCUMENTS

| CN | 111368560 A | * | 7/2020 | |
|---|---|---|---|---|
| CN | 113168560 A | | 7/2020 | |
| CN | 111581988 A | * | 8/2020 | ............. G06F 40/58 |
| CN | 112257471 A | * | 1/2021 | ............. G06F 40/58 |
| CN | 112417901 A | * | 2/2021 | |
| CN | 113204979 A | * | 8/2021 | ............. G06F 18/22 |

(Continued)

OTHER PUBLICATIONS

Search Report for European Application No. 22203878.8, dated Mar. 22, 2023, 10 pages.

(Continued)

*Primary Examiner* — Edwin S Leland, III
(74) *Attorney, Agent, or Firm* — Lippes Mathias LLP

(57) ABSTRACT

A method for training a non-autoregressive translation (NAT) model includes: acquiring a source language text, a target language text corresponding to the source language text and a target length of the target language text; generating a target language prediction text and a prediction length by inputting the source language text into the NAT model, in which initialization parameters of the NAT model are determined based on parameters of a pre-trained translation model; and obtaining a target NAT model by training the NAT model based on the target language text, the target language prediction text, the target length and the prediction length.

12 Claims, 5 Drawing Sheets

(56) References Cited

FOREIGN PATENT DOCUMENTS

| CN | 113378584 | A | * | 9/2021 |
| CN | 113657125 | A | * | 11/2021 |
| CN | 114091482 | A | * | 2/2022 |
| CN | 114186569 | A | * | 3/2022 |
| CN | 110457713 | B | * | 7/2023 |
| CN | 113378584 | B | * | 9/2023 |

OTHER PUBLICATIONS

Kasai, Jungo et al., "Deep Encoder, Shallow Decoder: Reevaluating Non-Autoregressive Machine Translation"; May 7, 2021; ICLR 2021; 16 Pages.

Gu, Jiatao et al., "Non-Autoregressive Neural Machine Translation"; Mar. 9, 2018; ICLR 2018; 13 pages.

Wang, Yiren et al., "Non-Autoregressive Machine Translation with Auxiliary Regularization"; Feb. 22, 2019; ICLR 2019; 8 pages.

Kasai, Jungo et al. "Non-autoregressive Machine Translation with Disentangled Context Transformer"; Jun. 30, 2020; ICLR 2020; 12 pages.

Office Action for Japanese Patent Application No. 2022-179428, dated Jan. 16, 2024, 3 pages.

\* cited by examiner

METHOD FOR TRAINING NON-AUTOREGRESSIVE TRANSLATION MODEL

CROSS REFERENCE TO RELATED APPLICATIONS

This application is filed based upon and claims priority to Chinese Patent Application No. 202111353568.8, filed on Nov. 16, 2021, the entire content of which is incorporated herein by reference for all purposes.

TECHNICAL FIELD

The disclosure relates to fields of deep learning and natural language processing in the field of artificial intelligence (AI) technology, and specifically to a method and an apparatus for training a non-autoregressive translation (NAT) model.

BACKGROUND

With the development of artificial intelligence (AI), translation between different languages through an application program or an intelligent terminal has become popular. In machine translation, the current model architecture widely adopted is an encoder-decoder structure. In detail, a source language text is first encoded by the encoder, and text information is converted into vector information. Then, the vector information is translated by the decoder into a target language text.

SUMMARY

According to a first aspect, a computer-implemented method for training a non-autoregressive translation (NAT) model includes: acquiring a source language text, a target language text corresponding to the source language text and a target length of the target language text; generating a target language prediction text and a prediction length by inputting the source language text into the NAT model, in which initialization parameters of the NAT model are determined based on parameters of a pre-trained translation model, training data of the pre-trained translation model includes a first hybrid text and a second hybrid text, the first hybrid text comprises a first source language text, a separator and a second target language text sequentially arranged, and the second hybrid text comprises a first target language text corresponding to the first source language text, the separator, and a second source language text corresponding to the second target language text sequentially arranged; and obtaining a target NAT model by training the NAT model based on the target language text, the target language prediction text, the target length and the prediction length.

According to a second aspect, an electronic device includes: at least one processor; and a memory stored instructions executable by the at least one processor. The at least one processor is configured to: acquire a source language text, a target language text corresponding to the source language text and a target length of the target language text; generate a target language prediction text and a prediction length by inputting the source language text into the NAT model, wherein initialization parameters of the NAT model are determined based on parameters of a pre-trained translation model, training data of the pre-trained translation model includes a first hybrid text and a second hybrid text, the first hybrid text comprises a first source language text, a separator and a second target language text sequentially arranged, and the second hybrid text comprises a first target language text corresponding to the first source language text, the separator, and a second source language text corresponding to the second target language text sequentially arranged; and obtain a target NAT model by training the NAT model based on the target language text, the target language prediction text, the target length and the prediction length.

According to a third aspect, a non-transitory computer-readable storage medium stored with computer instructions is provided, the computer instructions are configured to perform a method for training a non-autoregressive translation model as described in the first aspect of the disclosure.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

Figure 1:
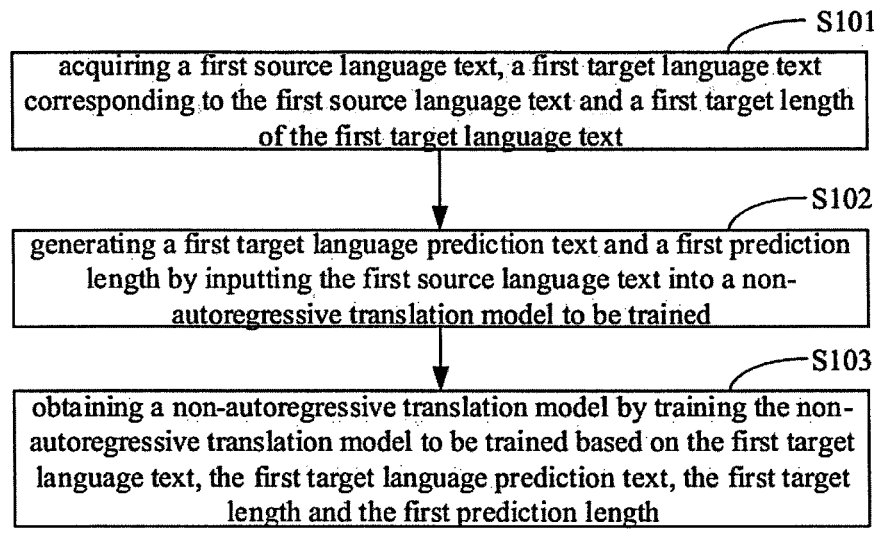
FIG. 1 is a flowchart illustrating a method for training a non-autoregressive translation model according to a first embodiment of the present disclosure.

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope of the present disclosure. Similarly, for clarity and conciseness, descriptions of well-known functions and structures are omitted in the following descriptions.

Artificial Intelligence (AI) is a new science of technology that studies and develops theories, methods, technologies and application systems configured to simulate, extend and expand human intelligence. At present, the AI technology is characterized by high automation, high accuracy and low cost, which is widely applied.

Deep Learning (DL) is a new research direction in the field of machine learning (ML) that learns inherent law and representation hierarchy of sample data, and information acquired in the learning process is of great help in interpretation of data such as words, images and sound. The final goal is that the machine may have analytic learning ability like humans, which may recognize data such as words, images, sound, etc. In terms of specific research contents, it mainly includes a neural network system based on a convolution operation (that is, a convolutional neural network); a self-encoding neural network based on a multi-layer neuron; and a deep belief network which is obtained by pre-training in a multi-layer self-encoding neural network and optimizing neural network weights in combination with authentication information. DL makes many achievements in search technology, data mining, machine learning, machine translation, natural language processing, multimedia learning, voice, recommendation, personalization technology and other related fields. DL enables the machine to imitate human activities such as seeing, hearing and thinking, which solves many complex difficulties of pattern recognition, so that AI-related technology makes great progress.

Natural language processing (NLP) is an important direction in the fields of computer science and AI, and mainly studies various theories and methods that may achieve effective communication between human and computer in natural language. NLP is a science that integrates linguistics, computer science and mathematics. NLP relates to natural language, that is, daily language of people. NLP is closely related to linguistics, but also has important differences from the linguistics. NLP studies a computer system that may effectively achieve natural language communication, especially a software system, rather than to generally study natural language. Therefore, it is a part of computer science.

For the "encoder-decoder" structure in the related art, the translation quality depends on the performance of the encoder and the decoder. In order to improve the translation speed, parallel decoding is performed in a non-autoregressive decoding manner. That is to say, a plurality of words may be simultaneously translated in one translation process. However, this method in the related is difficult to obtain a non-autoregressive translation (NAT) model with good performance by training based on a very small amount of scarce languages. In general, the model-training process in the related art is easy to fall into local optimum.

In order to overcome the above problem in the related, art, the disclosure provides a method and an apparatus for training a non-autoregressive translation model in the embodiment of the disclosure, which are described in combination with the accompanying drawings. The target NAT model obtained by the method in the disclosure may be of good performance for a very small amount of scarce languages.

FIG. 1 is a flowchart illustrating a method for training a non-autoregressive translation model according to a first embodiment of the present disclosure.

As illustrated in FIG. 1, the method for training a non-autoregressive translation model in the embodiment of the disclosure may specifically include the following steps at S101-S103.

At S101, a first source language text, a first target language text corresponding to the first source language text and a first target length of the first target language text are acquired.

Specifically, the method for training a non-autoregressive translation model in the embodiment of the disclosure may be executed by an apparatus for training a non-autoregressive translation model in the embodiment of the disclosure, and the apparatus may be a hardware device with a data information processing ability, and/or a software necessary to drive the work of the hardware device. Optionally, an execution subject may include a workstation, a server, a computer, a user terminal and other devices. The user terminal includes but not limited to a mobile phone, a computer, a smart voice interaction device, a smart appliance, a vehicle-mounted terminal, etc.

In an implementation, a certain language is selected from a plurality of languages of training data as a source language, for example, Chinese, and another language is selected as the target language, for example, English. The text to be translated in a source language is acquired from training data as the first source language text, and the text in a target language having the same semantics as the first source language text is acquired as the first target language text. Therefore, the first source language text, the first target language text corresponding to the first source language text and the first target length of the first target language text may be acquired. For example, the first target length may be a word number of the first target language text.

For example, taking Chinese as a source language and English as a target language, the acquired first source language text is "这是一个苹果", the first target language text corresponding to the first source language text is "This is an apple", and the first target length of the first target language text is the word number of "This is an apple", i.e., 4.

At S102, a first target language prediction text and a first prediction length are generated by inputting the first source language text into a non-autoregressive translation model to be trained.

In the embodiment of the disclosure, the non-aggressive translation model to be trained may be constructed based on an open-source mBART model. The model achieves text translation based on an encoder, a decoder and a length predictor. The initialization parameters of the non-autoregressive translation model to be trained may be determined based on parameters of a pre-trained translation model.

In an implementation, a pre-trained translation model to be trained is constructed based on the non-aggressive translation model to be trained. A first hybrid text and a second hybrid text are generated based on massive monolingual data, and are used as training data to train the pre-trained translation model to be trained. That is, the first hybrid text is input into the pre-trained translation model to be trained for text translation, to output a hybrid prediction text. The hybrid prediction text is compared with the second hybrid text to adjust parameters of the pre-trained translation model to be trained, to obtain a pre-trained translation model. The first hybrid text includes the second source language text, a separator and a second target language text sequentially arranged, and the second hybrid text includes a third target language text corresponding to the second source language text, the separator, and a third source language text corresponding to the second target language text sequentially arranged. It needs to be noted that, the second source language text and the second target language text may be not of the same semantics.

For example, taking Chinese as a source language and English as a target language, the first hybrid text may be " 她去上学了 </s> It is sunny today", and the second hybrid text is "She went to school </s> 今天是晴天 ".

Figure 2:
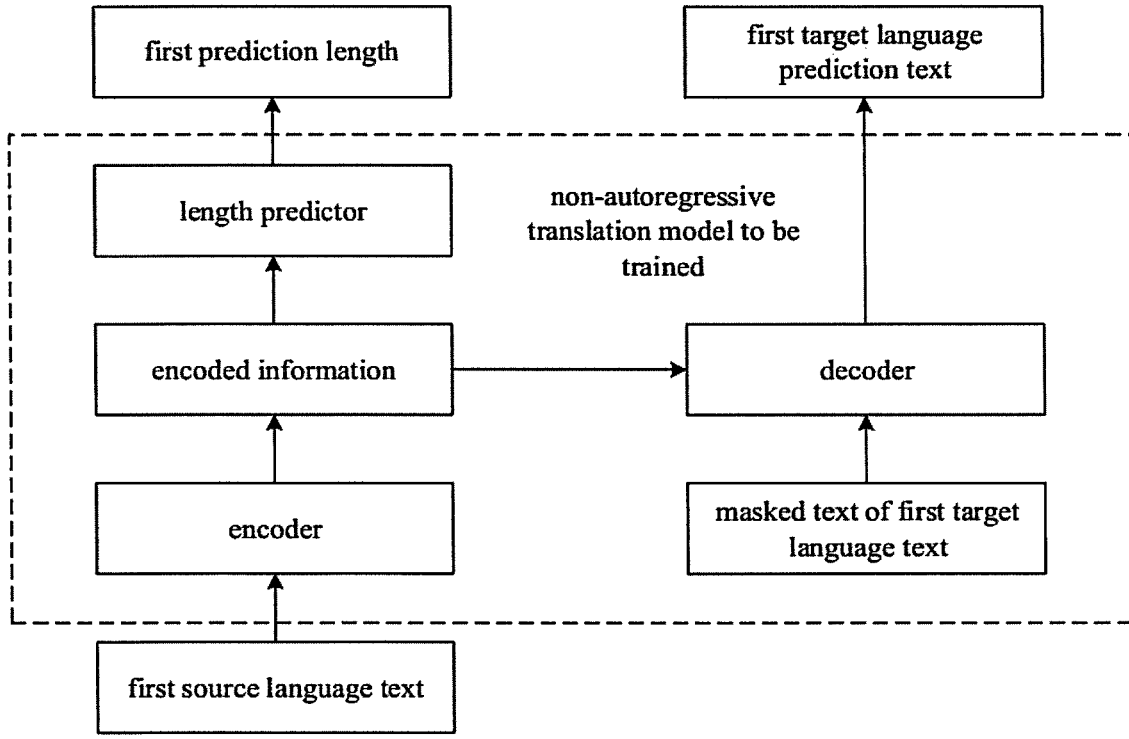
FIG. 2 is a block diagram of training a non-autoregressive translation model in the method for training a non-autoregressive translation model according to the present disclosure.

The non-autoregressive translation model to be trained is trained after its parameter initialization is performed. As illustrated in FIG. 2, the first source language text is input into the non-autoregressive translation model to be trained, the encoder encodes the first source language text to generate encoded information, and the length predictor generates the first prediction length (i.e., the length of the first target language prediction text), based on the encoded information. In the embodiment of the present disclosure, mask operation is performed on the first target language text corresponding to the first source language text, to generate a masked text, of the first target, language text, which is served as an input of the decoder. The decoder decodes the masked text of the first target language text based on the encoded information to generate the first target language prediction text.

At S103, a non-autoregressive translation model is obtained by training the non-autoregressive translation model to be trained based on the first target language text, the first target language prediction text, the first target length and the first prediction length.

In the embodiment of the disclosure, the non-autoregressive translation model is obtained by: adjusting the parameters of the non-autoregressive translation model to be trained based on a matching degree between the first target language text and the first target language prediction text, and whether the first target length and the first prediction length are of the same length, training the non-autoregressive translation model to be trained after parameter adjustment and constantly performing parameter optimization through iterative training.

In an implementation, when the non-autoregressive translation model in the embodiment of the disclosure performs text translation on the source language text, the length predictor predicts the length of the target language text, and generates the target language text based on the prediction length, which improves the performance of the non-autoregressive translation model.

Figure 3:
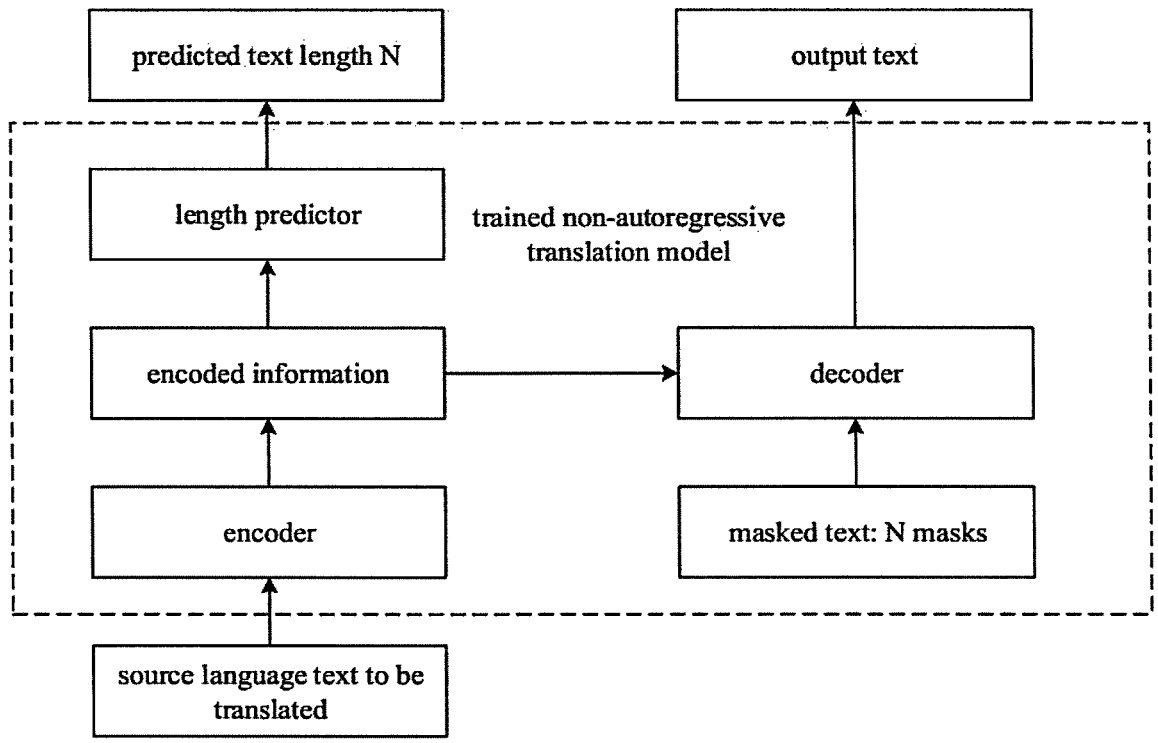
FIG. 3 is a diagram illustrating the first inference of the non-autoregressive translation model in the method for training a non-autoregressive translation model according to the present disclosure.

For example, when the non-autoregressive translation model performs text translation on the source language text, there are a plurality of inference processes. As illustrated in FIG. 3, a first inference process of the non-autoregressive translation model includes: inputting the source language text to be translated into the trained non-autoregressive translation model, encoding by the encoder, the source language text to be translated to generate encoded information, and outputting by the length predictor, the predicted text length N based on the encoded information, and inputting the masked text "N masks" with the length of N into the decoder, and decoding by the decoder, the masked text based on the encoded information to obtain an output text.

For example, when the source language text to be translated is "这是一个苹果", and the predicted text length N is equal to 4, the masked text is "<mask> <mask> <mask> <mask>", and the decoder decodes the masked text to obtain an output text, for example, "that is an apple".

Figure 4:
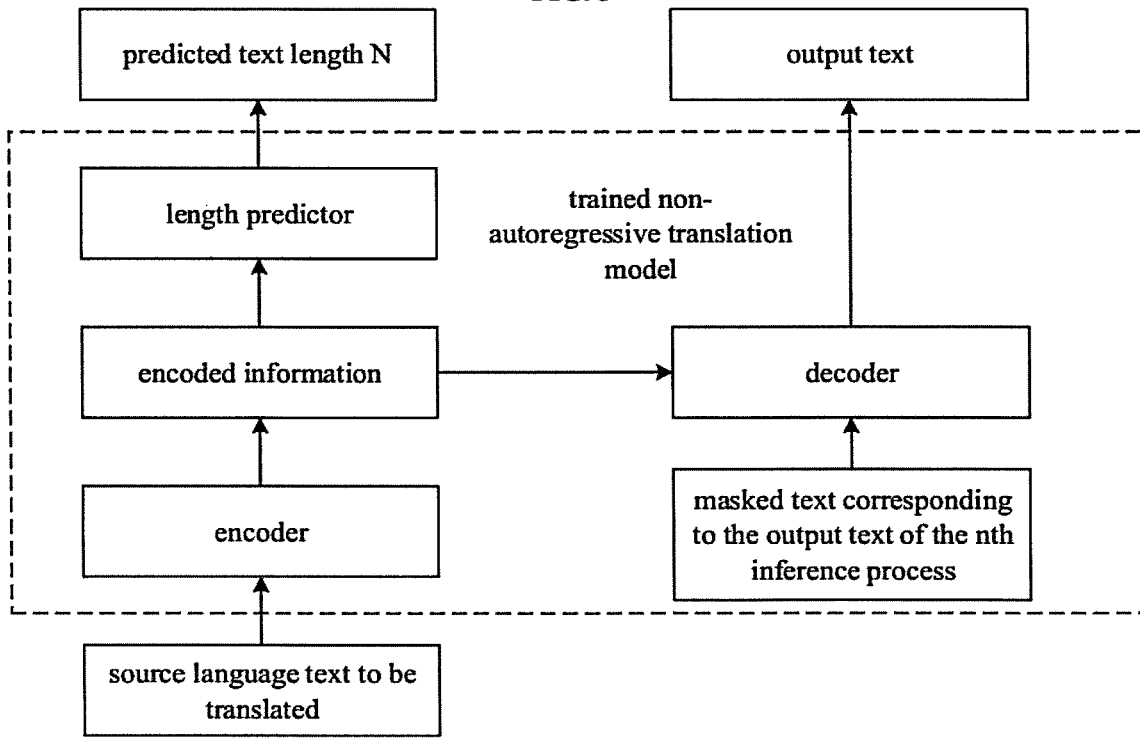
FIG. 4 is a diagram illustrating the (n+1)th inference of the non-autoregressive translation model in the method for training a non-autoregressive translation model according to the present disclosure.

As illustrated in FIG. 4, when the non-autoregressive translation model performs (n+1)th inference (n is a non-zero natural number), K characters/words with a higher probability are selected from the output text in the nth inference process based on the probability of decoding correctly, and a sequence of the remaining characters/words is masked to generate a masked text corresponding to the output text of the nth inference process, which is serve as the input text of the decoder in the (n+1)th inference process. The decoder decodes the input text based on the encoded information to obtain an output text.

For example, in the second inference, the input text of the decoder may be "<mask> is <mask> apple", and the decoder decodes the input text "<mask> is <mask> apple" to obtain an output text of the second inference, for example "this is an apple".

It should be noted that, the output text of the last inference process is taken as the target language prediction text output by the non-autoregressive translation model, and the number of inference processes may be set as needed, which is not limited in the present disclosure.

In summary, according to the method for training a non-autoregressive translation model, the first source language text, the first target language text corresponding to the first source language text and the first target length of the first target language text are acquired; the first target language prediction text and the first prediction length are generated by inputting the first source language text into the non-autoregressive translation model to be trained; and a non-autoregressive translation model is obtained by training the non-autoregressive translation model to be trained based on the first target language text, the first target language prediction text, the first target length and the first prediction length. The initialization parameters of the non-autoregressive translation model to be trained are determined based on parameters of the pre-trained translation model. The training data of the pre-trained translation model is the first hybrid text and the second hybrid text, in which the first hybrid text includes the second source language text, the separator and the second target language text sequentially arranged, and the second hybrid text includes the third target language text corresponding to the second source language text, the separator, and the third source language text corresponding to the second target language text sequentially arranged. In the disclosure, parameter initialization is performed on the non-autoregressive translation model to be trained through the pre-trained translation model, which may reduce the time of training the non-autoregressive translation model, avoid local optimum and improve the training effect of the model.

Figure 5:
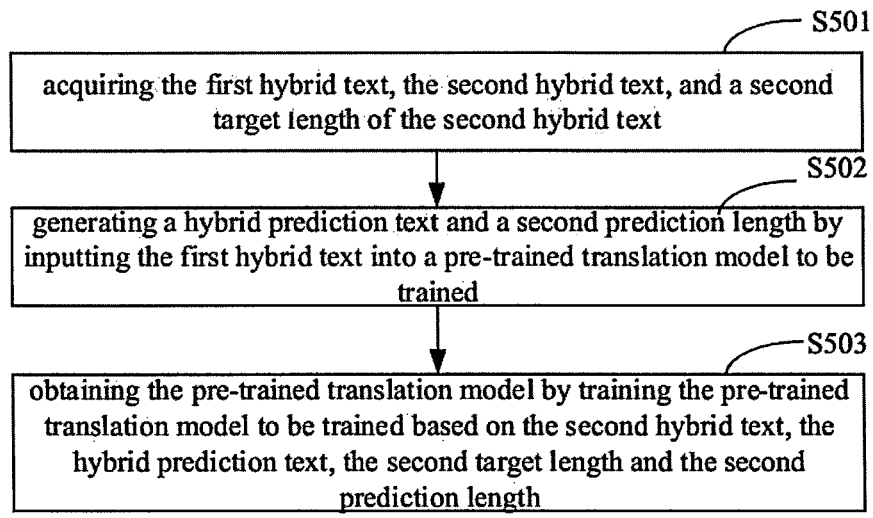
FIG. 5 is a flowchart illustrating a method for training a non-autoregressive translation model according to a second embodiment of the present disclosure.

FIG. 5 is a flowchart illustrating a method for training a non-autoregressive translation model according to a second embodiment of the present disclosure.

As illustrated in FIG. 5, on the basis of the embodiment as illustrated in FIG. 1, the method for training a non-autoregressive translation model in the embodiment of the disclosure further includes a method for generating the pre-trained translation model, which specifically may include the following steps at S501-S503.

At S501, the first hybrid text, the second hybrid text, and a second target length of the second hybrid text are acquired.

In the embodiment of the disclosure, the first hybrid text, the second hybrid text, and the second target length of the second hybrid text are acquired from training data. The first hybrid text includes a second source language text, a separator and a second target language text sequentially arranged. The second hybrid text includes a third target language text corresponding to the second source language text, the separator, and a third source language text corresponding to the second target language text sequentially arranged.

At S502, a hybrid prediction text and a second prediction length are generated by inputting the first hybrid text into a pre-trained translation model to be trained.

In the embodiment of the disclosure, the hybrid prediction text and the second prediction length are generated by an encoder, a length predictor and a decoder, in response to inputting the first hybrid text into the pre-trained translation model to be trained.

At S503, the pre-trained translation model is obtained by training the pre-trained translation model to be trained based on the second hybrid text, the hybrid prediction text, the second target length and the second prediction length.

In the embodiment of the disclosure, the trained pre-trained translation model is obtained by: adjusting the parameters of the pre-trained translation model based on a matching degree between the second hybrid text and the hybrid prediction text, and whether the second target length and the second prediction length are of the same length, training the pre-trained translation model after parameter adjustment and constantly performing parameter optimization through iterative training.

Figure 6:
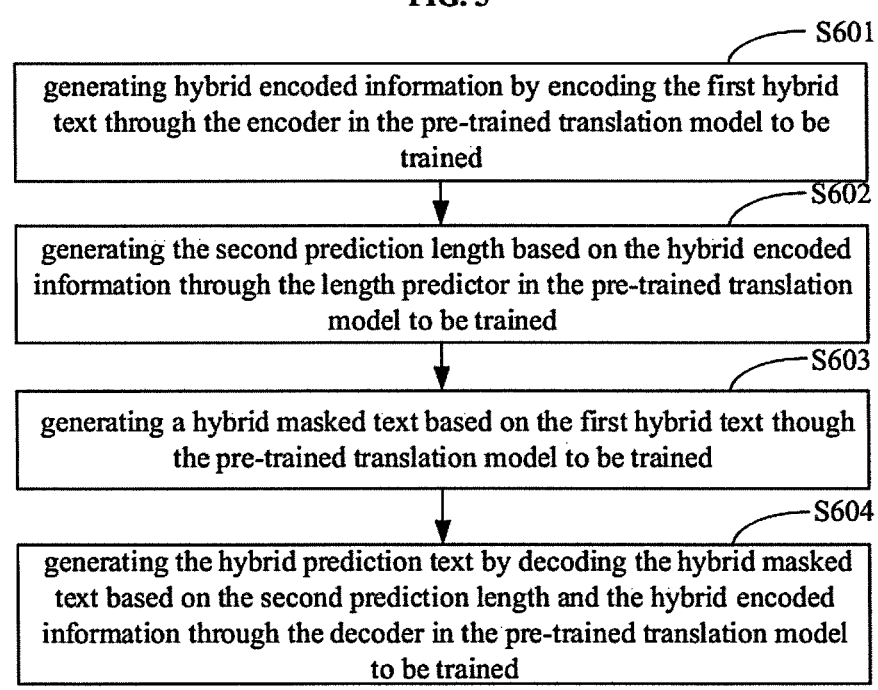
FIG. 6 is a flowchart illustrating a method for training a non-autoregressive translation model according to a third embodiment of the present disclosure.

Further, on the basis of the above embodiment, as illustrated in FIG. 6, the pre-trained translation model to be trained generates the hybrid prediction text and the second prediction length by the following steps at S601-S604:

At S601, the encoder in the pre-trained translation model to be trained generates hybrid encoded information by encoding the first hybrid text.

Figure 7:
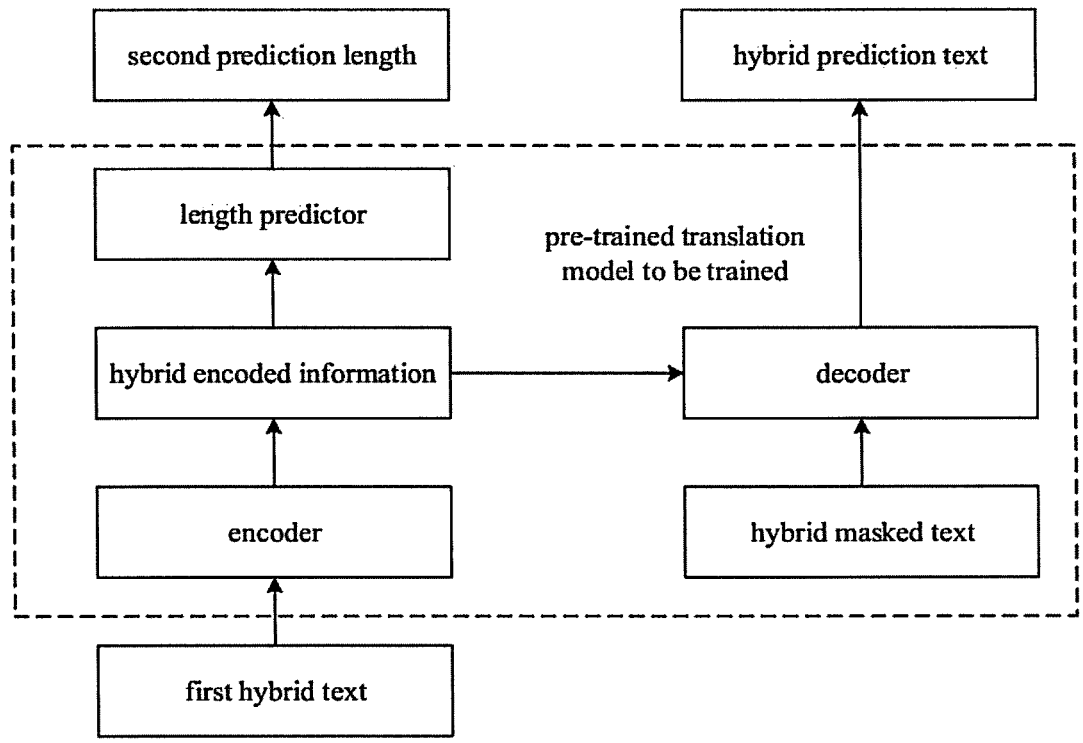
FIG. 7 is a diagram illustrating a pre-trained translation model in a method for training a non-autoregressive translation model according to the present disclosure.

In the embodiment of the disclosure, as illustrated in FIG. 7, the hybrid encoded information is generated by inputting the first hybrid text into the encoder in the pre-trained translation model to be trained, and encoding by the encoder the first hybrid text.

At S602, the length predictor in the pre-trained translation model to be trained generates the second prediction length based on the hybrid encoded information.

At S603, the pre-trained translation model to be trained generates a hybrid masked text based on the first hybrid text.

In the embodiment of the disclosure, mask operation may be performed on the words in the first hybrid text to generate a hybrid masked text, for example, the second source language text and the second target language text in the first hybrid text are sequentially reversed, and words in the reverted text are masked randomly. For example, when the first hybrid text is "这是一个苹果 </s> This is an apple", the hybrid masked text may be "<mask> is an apple</s> 这 <mask>一个苹果".

At S604, the decoder in the pre-trained translation model to be trained generates the hybrid prediction text by decoding the hybrid masked text based on the second prediction length and the hybrid encoded information.

In the embodiment of the disclosure, the decoder in the pre-trained translation model to be trained generates the hybrid prediction text by decoding the hybrid masked text based on the second prediction length output by the length predictor and the encoded information output by the encoder.

Therefore, the trained pre-trained translation model may be acquired, the initialization parameters of the non-autoregressive translation model to be trained are determined based on parameters of the encoder in the pre-trained translation model, and the parameters of the decoder in the non-autoregressive translation model to be trained are determined based on the parameters of the decoder in the pre-trained translation model.

In summary, according to the method for training a non-autoregressive translation model, the first source language text, the first target language text corresponding to the first source language text and the first target length of the first target language text are acquired; the first target language prediction text and the first prediction length are generated by inputting the first source language text into the non-autoregressive translation model to be trained; and the non-autoregressive translation model is obtained by training the non-autoregressive translation model to be trained based on the first target language text, the first target language prediction text, the first target length and the first prediction length. The initialization parameters of the non-autoregressive translation model to be trained are determined based on parameters of the pre-trained translation model. The training data of the pre-trained translation model is the first hybrid text and the second hybrid text, in which the first hybrid text includes the second source language text, the separator and the second target language text sequentially arranged, and the second hybrid text includes the third target language text corresponding to the second source language text, the separator, and the third source language text corresponding to the second target language text sequentially arranged. Therefore, the pre-trained translation model to be trained is trained through massive monolingual data, the initialization parameters of the non-autoregressive translation model to be trained are determined based on parameters of the encoder in the pre-trained translation model, and the parameters of the decoder in the non-autoregressive translation model to be trained are determined based on the parameters of the decoder in the pre-trained translation model. On the basis of this, the time of training the non-autoregressive translation model may be reduced, local optimum may be avoided and the training effect of the model may be improved.

Figure 8:
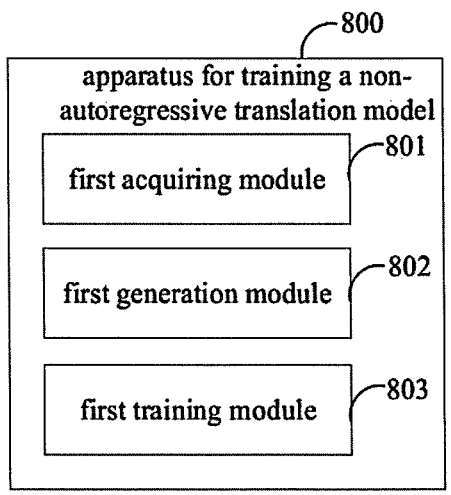
FIG. 8 is a block diagram illustrating an apparatus for training a non-autoregressive translation model according to a first embodiment of the present disclosure.

FIG. 8 is a block diagram illustrating an apparatus for training a non-autoregressive translation model according to a first embodiment of the present disclosure.

As illustrated in FIG. 8, an apparatus 800 for training a non-autoregressive translation model in the embodiment of the present disclosure includes a first acquiring module 801, a first generation module 802 and a first training module 803.

The first acquiring module 801 is configured to acquire a first source language text, a first target language text corresponding to the first source language text and a first target length of the first target language text.

The first generation module 802 is configured to generate a first target language prediction text and a first prediction length by inputting the first source language text into a non-autoregressive translation model to be trained, in which initialization parameters of the non-autoregressive translation model to be trained are determined based on parameters of a pre-trained translation model, training data of the pre-trained translation model is a first hybrid text and a second hybrid text, the first hybrid text includes a second source language text, a separator and a second target language text sequentially arranged, and the second hybrid text includes a third target language text corresponding to the second source language text, the separator, and a third source language text corresponding to the second target language text sequentially arranged.

The first training module 803 is configured to obtain the non-autoregressive translation model by training the non-autoregressive translation model to be trained based on the first target language text, the first target language prediction text, the first target length and the first prediction length.

It should be noted that the foregoing explanation of the embodiment of a method for training the non-autoregressive translation model is also applied to an apparatus for training the non-autoregressive translation model in the embodiment, which will not be repeated here.

In summary, according to the apparatus for training a non-autoregressive translation model, the first source language text, the first target language text corresponding to the first source language text and the first target length of the first target language text are acquired; the first target language prediction text and the first prediction length are generated by inputting the first source language text into the non-autoregressive translation model to be trained, in which initialization parameters of the non-autoregressive translation model to be trained are determined based on parameters of the pre-trained translation model, the training data of the pre-trained translation model is the first hybrid text and the second hybrid text, the first hybrid text includes the second source language text, the separator and the second target language text sequentially arranged, and the second hybrid text includes the third target language text corresponding to the second source language text, the separator, and the third source language text corresponding to the second target language text sequentially arranged; and the non-autoregressive translation model is obtained by training the non-autoregressive translation model to be trained based on the first target language text, the first target language prediction text, the first target length and the first prediction length. In the disclosure, parameter initialization is performed on the non-autoregressive translation model to be trained through the pre-trained translation model, which may reduce the time of training the non-autoregressive translation model, avoid local optimum and improve the training effect of the model.

Figure 9:
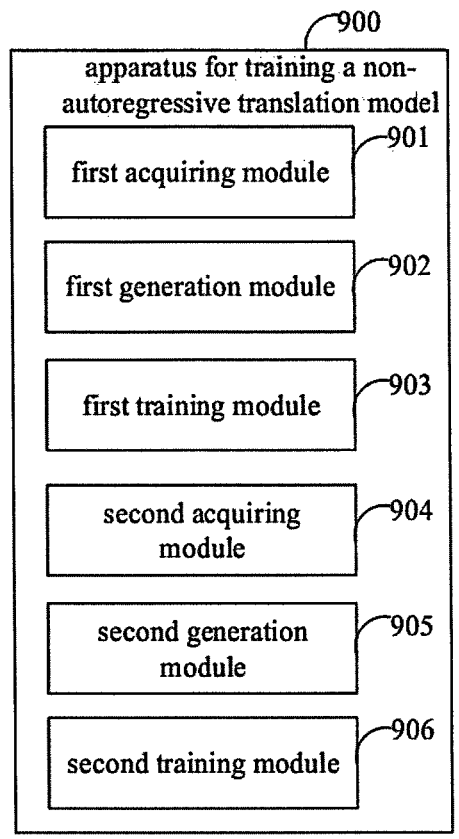
FIG. 9 is a block diagram illustrating an apparatus for training a non-autoregressive translation model according to a first embodiment of the present disclosure.

FIG. 9 is a block diagram illustrating an apparatus for training a non-autoregressive translation model according to a second embodiment of the present disclosure.

As illustrated in FIG. 9, an apparatus 900 for training a non-autoregressive translation model in the embodiment of the present disclosure includes a first acquiring module 901, a first generation module 902 and a first training module 903.

The first acquiring module 901 has the same structure and function with the first acquiring module 801 in the above embodiment, the first generation module 902 has the same structure and function with the first generation module 802 in the above embodiment, and the first training module 903 has the same structure and function with the first training module 803 in the above embodiment.

Further, the initialization parameters of the encoder in the non-autoregressive translation model to be trained are determined based on the parameters of the encoder in the pre-trained translation model, and the initialization parameters of the decoder in the non-autoregressive translation model to be trained are determined based on the parameters of the decoder in the pre-trained translation model.

Further, the training apparatus 900 further may include a second acquiring module 904, a second generation module 905 and a second training module 906. The second acquiring module 904 is configured to acquire the first hybrid text, the second hybrid text, and a second target length of the second hybrid text; the second generation module 905 is configured to generate a hybrid prediction text and a second prediction length by inputting the first hybrid text into a pre-trained translation model to be trained; and the second training module 906 is configured to obtain the pre-trained translation model by training the pre-trained translation model to be trained based on the second hybrid text, the hybrid prediction text, the second target length and the second prediction length.

Further, the second generation module 905 specifically may include: a encoding unit, a length prediction unit, a generation unit and a decoding unit. The encoding unit is configured to generate hybrid encoded information by encoding the first hybrid text through the encoder in the pre-trained translation model to be trained; the length prediction unit is configured to generate the second prediction length based on the hybrid encoded information through the length predictor in the pre-trained translation model to be trained; the generation unit is configured to generate a hybrid masked text based on the first hybrid text through the pre-trained translation model to be trained; and the decoding unit is configured to generate the hybrid prediction text by decoding the hybrid masked text based on the second prediction length and the encoded information through the decoder in the pre-trained translation model to be trained.

Further, the generation unit specifically may include a generation subunit. The first generation unit is configured to generate the hybrid masked text by performing mask operation randomly on a word in the first hybrid text through the pre-trained translation model to be trained.

In summary, according to the apparatus for training a non-autoregressive translation model, the first source language text, the first target language text corresponding to the first source language text and the first target length of the first target language text are acquired; the first target language prediction text and the first prediction length are generated by inputting the first source language text into the non-autoregressive translation model to be trained, in which initialization parameters of the non-autoregressive translation model to be trained are determined based on parameters of the pre-trained translation model, the training data of the pre-trained translation model is the first hybrid text and the second hybrid text, the first hybrid text includes the second source language text, the separator and the second target language text sequentially arranged, and the second hybrid text includes the third target language text corresponding to the second source language text, the separator, and the third source language text corresponding to the second target language text sequentially arranged; and the non-autoregressive translation model is obtained by training the non-autoregressive translation model to be trained based on the first target language text, the first target language prediction text, the first target length and the first prediction length. In the disclosure, parameter initialization is performed on the non-autoregressive translation model to be trained through the pre-trained translation model, which may reduce the time of training the non-autoregressive translation model, avoid local optimum and improve the training effect of the model.

Collection, storage, use, processing, transmission, provision and disclosure of the user personal information involved in the technical solution of the disclosure comply with relevant laws and regulations, and do not violate public order and good customs.

According to the embodiment of the disclosure, an electronic device, a readable storage medium and a computer program product are further provided in the disclosure.

Figure 10:
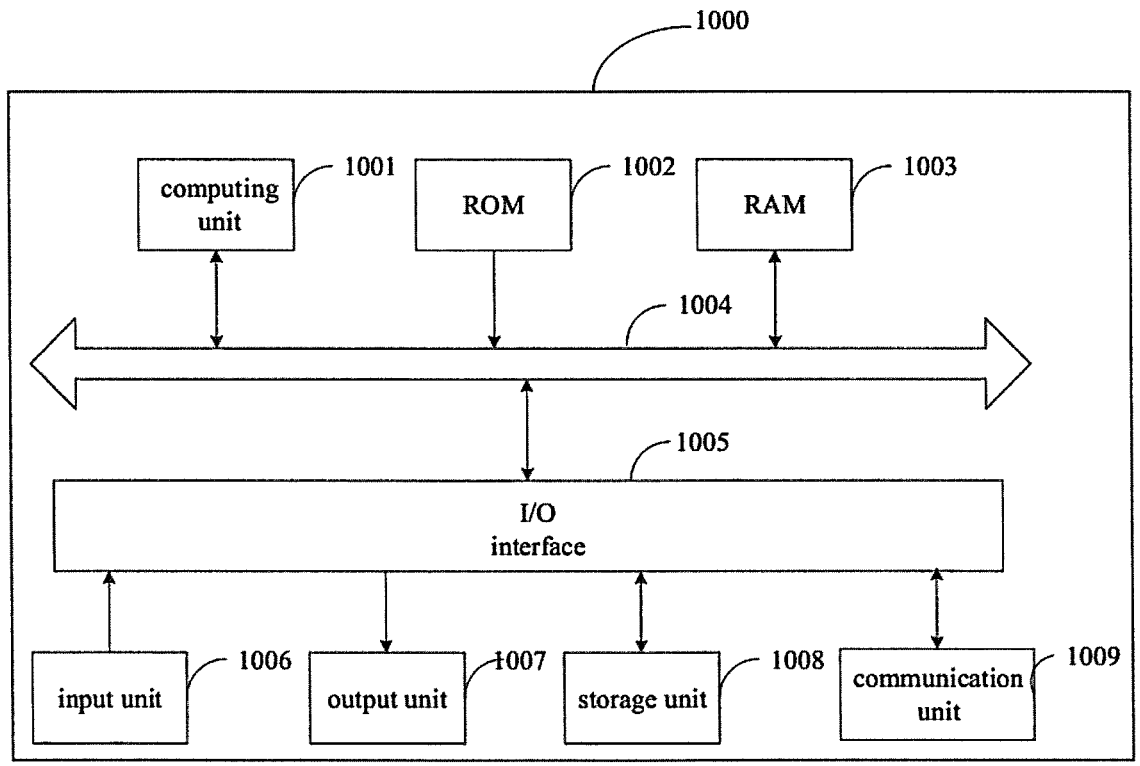
FIG. 10 is a block diagram illustrating an electronic device configured to implement a method for training a non-autoregressive translation model in the embodiment of the present disclosure.

FIG. 10 is a schematic block diagram illustrating an example electronic device 1000 in the embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 10, the electronic device 1000 includes a computing unit 1001, which may execute various appropriate actions and processes based on a computer program stored in a read-only memory (ROM) 1002 or a computer program loaded into a random access memory (RAM) 1003 from a storage unit 1008. In the RAM 1003, various programs and data required for operation of the electronic device 1000 may also be stored. The computing unit 1001, the ROM 1002 and the RAM 1003 may be connected to each other by a bus 1004. An input/output (I/O) interface 1005 is also connected to the bus 1004.

The plurality of components in the electronic device 1000 are connected to the I/O interface 1005, and includes: an input unit 1006, for example, a keyboard, a mouse, etc.; an output unit 1007, for example various types of displays, speakers; a storage unit 1008, for example a magnetic disk, an optical disk; and a communication unit 1009, for example, a network card, a modem, a wireless transceiver. The communication unit 1009 allows the electronic device 1000 to exchange information/data through a computer network such as internet and/or various types of telecommunication networks and other devices.

The computing unit 1001 may be various types of general and/or dedicated processing components with processing and computing ability. Some examples of the computing unit 1001 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 1001 performs various methods and processes as described above, for example, methods for training a non-autoregressive translation model as illustrated in FIG. 1 to FIG. 7. For example, in some embodiments, the method for training a non-autoregressive translation model may be further achieved as a computer software program, which is physically contained in a machine readable medium, such as the storage unit 1008. In some embodiments, some or all of the computer programs may be loaded and/or mounted on the electronic device 1000 via the ROM 1002 and/or the communication unit 1009. When the computer program is loaded on the RAM 1003 and executed by the computing unit 1001, one or more steps in the method for training a non-autoregressive translation model may be performed. Alternatively, in other embodiments, the computing unit 1001 may be configured to perform a method for training a non-autoregressive translation model in other appropriate ways (for example, by virtue of a firmware).

Various implementation modes of the systems and technologies described above may be implemented in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with a user, the systems and technologies described here may be implemented on a computer, and the computer has: a display apparatus for displaying information to a user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. The server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

According to an embodiment of the disclosure, a computer program product including a computer program is further provided in the disclosure, the computer program is configured to perform the method for training a non-autoregressive translation model as described in the above embodiment when performed by a processor.

It should be understood that, various forms of procedures shown above may be configured to reorder, add or delete blocks. For example, steps described in the disclosure may be performed in parallel, sequentially, or in a different order, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the principle of embodiments of the present disclosure shall be included within the protection scope of the present disclosure.

What is claimed is:

1. A computer-implemented method for training a non-auto regressive translation (NAT) model, comprising:
  acquiring a source language text, a target language text corresponding to the source language text and a target length of the target language text;
  generating a target language prediction text and a prediction length by inputting the source language text into the NAT model, wherein initialization parameters of an encoder in the NAT model are determined based on parameters of an encoder in a pre-trained translation model, initialization parameters or a decoder in the NAT model are determined based on parameters of a decoder in the pre-trained translation model, training data of the pre-trained translation model includes a first hybrid text and a second hybrid text, the first hybrid text comprises a first source language text, a separator and a second target language text sequentially arranged, and the second hybrid text comprises a first target language text corresponding to the first source language text, the separator, and a second source language text corresponding to the second target language text sequentially arranged;
  obtaining a target NAT model by training the NAT model based on the target language text, the target language prediction text, the target length and the prediction length;
  performing machine translation on scarce languages using the target NAT model.

2. The method of claim 1, further comprising:
  acquiring the first hybrid text, the second hybrid text, and a target length of the second hybrid text;
  generating a hybrid prediction text and a prediction length of the first hybrid text, by inputting the first hybrid text into a translation model to be trained; and
  obtaining the pre-trained translation model by training the translation model to be trained based on the second hybrid text, the hybrid prediction text, the target length of the second hybrid text and the prediction length of the first hybrid text.

3. The method of claim 2, wherein the translation model to be trained generates the hybrid prediction text and the prediction length of the first hybrid text by acts of:
  generating hybrid encoded information by encoding the first hybrid text through an encoder in the translation model to be trained;
  generating the prediction length of the first hybrid text based on the hybrid encoded information through a length predictor in the translation model to be trained;
  generating a hybrid masked text based on the first hybrid text through the translation model to be trained; and
  generating the hybrid prediction text by decoding the hybrid masked text based on the prediction length of the first hybrid text and the hybrid encoded information through a decoder in the translation model to be trained.

4. The method of claim 3, wherein generating the hybrid masked text based on the first hybrid text through the translation model to be trained comprises:
  generating the hybrid masked text by performing mask operation randomly on words in the first hybrid text through the translation model to be trained.

5. An electronic device, comprising:
  at least one processor; and
  a memory stored with instructions executable by the at least one processor;
  wherein the at least one processor is configured to:
  acquire a source language text, a target language text corresponding to the source language text and a target length of the target language text;
  generate a target language prediction text and a prediction length by inputting the source language text into the NAT model, wherein initialization parameters of an encoder in the NAT model are determined based on parameters of an encoder in a pre-trained translation model, initialization parameters of a decoder in the NAT model are determined based on parameters of a decoder in the pre-trained translation model, training data of the pre-trained translation model includes a first hybrid text and a second hybrid text, the first hybrid text comprises a first source language text, a separator and a second target language text sequentially arranged, and the second hybrid text comprises a first target language text corresponding to the first source language text, the separator, and a second source language text corresponding to the second target language text sequentially arranged;
  obtain a target NAT model by training the NAT model based on the target language text, the target language prediction text, the target length and the prediction length; and perform machine translation on scarce languages using the target NAT model.

6. The electronic device of claim 5, further comprising:
acquiring the first hybrid text, the second hybrid text, and a target length of the second hybrid text;
generating a hybrid prediction text and a prediction length of the first hybrid text, by inputting the first hybrid text into a translation model to be trained; and
obtaining the pre-trained translation model by training the translation model to be trained based on the second hybrid text, the hybrid prediction text, the target length of the second hybrid text and the prediction length of the first hybrid text.

7. The electronic device of claim 6, wherein the at least one processor is further configured to:
generate hybrid encoded information by encoding the first hybrid text through an encoder in the translation model to be trained;
generate the prediction length of the first hybrid text based on the hybrid encoded information through a length predictor in the translation model to be trained;
generate a hybrid masked text based on the first hybrid text through the translation model to be trained; and
generate the hybrid prediction text by decoding the hybrid masked text based on the prediction length of the first hybrid text and the hybrid encoded information through a decoder in the translation model to be trained.

8. The electronic device of claim 7, wherein the at least one processor is further configured to:
generate the hybrid masked text by performing mask operation randomly on words in the first hybrid text through the translation model to be trained.

9. A non-transitory computer-readable storage medium stored with computer instructions, wherein, when the computer instructions cause a computer to perform a method for training a non-autoregressive translation (NAT) model, the method comprising:
acquiring a source language text, a target language text corresponding to the source language text and a target length of the target language text;
generating a target language prediction text and a prediction length by inputting the source language text into the NAT model, wherein initialization parameters of an encoder in the NAT model are determined based on parameters of an encoder in a pre-trained translation model, initialization parameters of a decoder in the NAT model are determined based on parameters of a decoder in the pre-trained translation model, training data of the pre-trained translation model includes a first hybrid text and a second hybrid text, the first hybrid text comprises a fast source language text, a separator and a second target language text sequentially arranged, and the second hybrid text comprises a first target language text corresponding to the first source language text, the separator, and a second source language text corresponding to the second target language text sequentially arranged;
obtaining a target NAT model by training the NAT model based on the target language text, the target language prediction text, the target length and the prediction length; and
performing machine translation on scarce languages using the target NAT model.

10. The storage medium of claim 9, wherein the method further comprises:
acquiring the first hybrid text, the second hybrid text, and a target length of the second hybrid text;
generating a hybrid prediction text and a prediction length of the first hybrid text, by inputting the first hybrid text into a translation model to be trained; and
obtaining the pre-trained translation model by training the translation model to be trained based on the second hybrid text, the hybrid prediction text, the target length of the second hybrid text and the prediction length of the first hybrid text.

11. The storage medium of claim 10, wherein the translation model to be trained generates the hybrid prediction text and the prediction length of the first hybrid text by acts of:
generating hybrid encoded information by encoding the first hybrid text through an encoder in the translation model to be trained;
generating the prediction length of the first hybrid text based on the hybrid encoded information through a length predictor in the translation model to be trained;
generating a hybrid masked text based t hybrid text through the translation model to be trained; and
generating the hybrid prediction text by decoding the hybrid masked text based on the prediction length of the first hybrid text and the hybrid encoded information through a decoder in the translation model to be trained.

12. The storage medium of claim 11, wherein generating the hybrid masked text based on the first hybrid text through the translation model to be trained comprises:
generating the hybrid masked text by performing mask operation randomly on words in the first hybrid text through the translation model to be trained.

* * * * *